(12) United States Patent
Krewet et al.

(10) Patent No.: US 10,627,071 B2
(45) Date of Patent: Apr. 21, 2020

(54) TAIL LIGHT WITH A LIGHT GUIDE EMITTING GROUND LIGHT AND BACK-UP LIGHT

(71) Applicant: HELLA GmbH & Co. KGaA, Lippstadt (DE)

(72) Inventors: Frank Krewet, Geseke (DE); Martin Vollmer, Erwitte (DE); Claudia Zens, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/251,889

(22) Filed: Jan. 18, 2019

(65) Prior Publication Data

US 2019/0219245 A1 Jul. 18, 2019

(30) Foreign Application Priority Data

Jan. 18, 2018 (DE) ........................ 10 2018 101 036

(51) Int. Cl.
| | |
|---|---|
| *F21S 43/241* | (2018.01) |
| *F21S 43/14* | (2018.01) |
| *B60Q 1/22* | (2006.01) |
| *B60Q 1/24* | (2006.01) |
| *B60Q 1/34* | (2006.01) |
| *F21Y 115/10* | (2016.01) |
| *F21W 103/45* | (2018.01) |

(52) U.S. Cl.
CPC ............. *F21S 43/241* (2018.01); *B60Q 1/22* (2013.01); *B60Q 1/24* (2013.01); *B60Q 1/34* (2013.01); *F21S 43/14* (2018.01); *F21W 2103/45* (2018.01); *F21Y 2115/10* (2016.08)

(58) Field of Classification Search
CPC combination set(s) only.
See application file for complete search history.

(56) References Cited

U.S. PATENT DOCUMENTS

| | | | |
|---|---|---|---|
| 7,815,345 B2 * | 10/2010 | Misawa ............... | B60Q 1/2696 362/327 |
| 10,119,673 B2 * | 11/2018 | Nakajima ............... | B60Q 1/22 |
| 2016/0209000 A1 | 7/2016 | Kürschner et al. | |

FOREIGN PATENT DOCUMENTS

DE     102005042574 A1     3/2007

* cited by examiner

*Primary Examiner* — Robert J May
(74) *Attorney, Agent, or Firm* — Muncy, Geissler, Olds & Lowe, P.C.

(57) ABSTRACT

A tail light with at least one light source and with a light guide body into which light generated by the light source can be coupled and out of which back-up light can be coupled, and light for illuminating the ground region can be decoupled. The light guide body has a light entry area through which light from the light source can be coupled into the light guide body. The light guide body has at least a first light exit area for the back-up light and a second light exit area for the light for illuminating the ground region, wherein the first and the second light exit areas may overlap. The light guide body has a first reflection surface at which a portion of the coupled-in light can be deflected in the direction of at least one of the light exit areas.

12 Claims, 4 Drawing Sheets

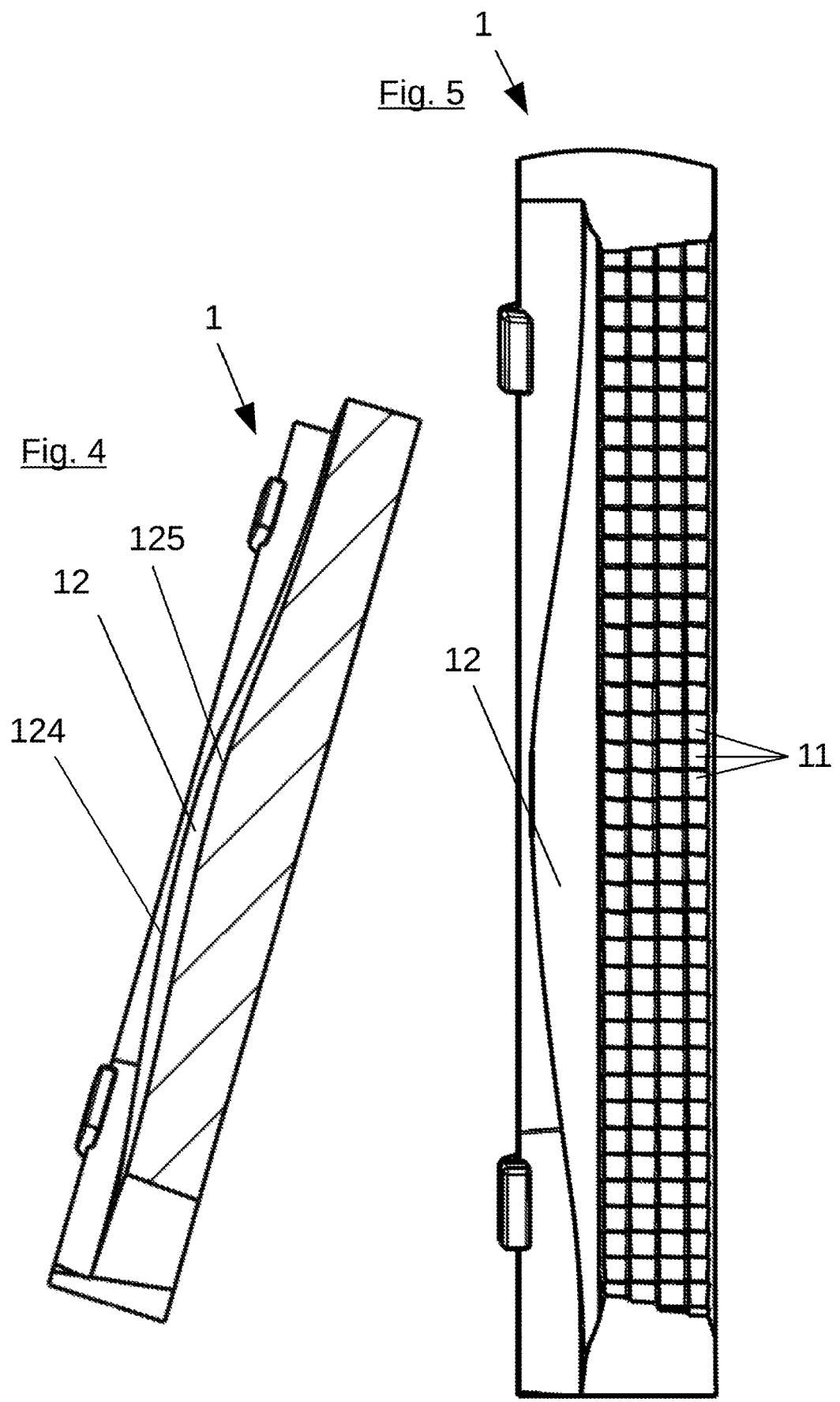

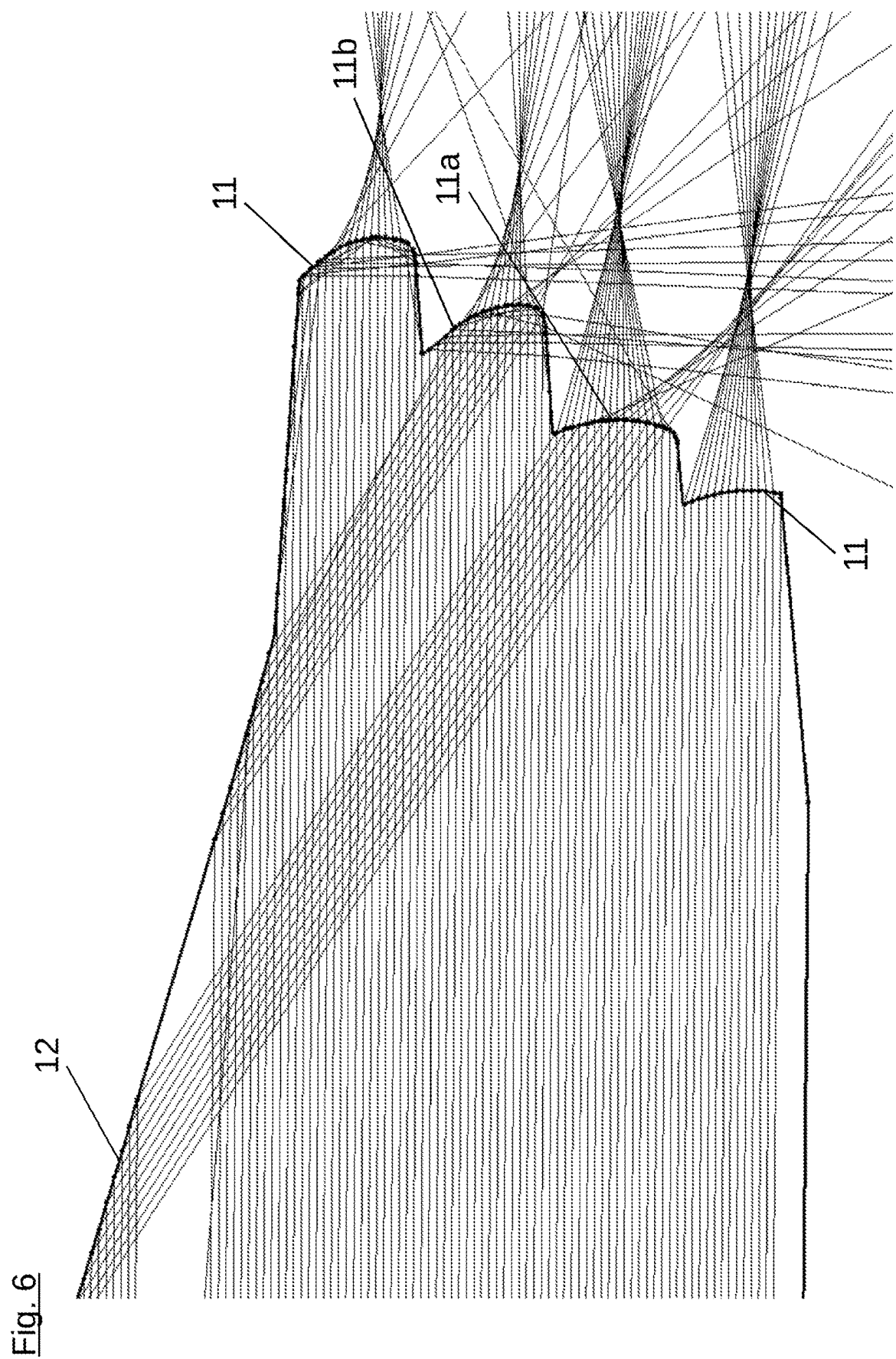

TAIL LIGHT WITH A LIGHT GUIDE EMITTING GROUND LIGHT AND BACK-UP LIGHT

This nonprovisional application claims priority under 35 U.S.C. § 119(a) to German Patent Application No. 102018101036.2, which was filed in Germany on Jan. 18, 2018, and which is herein incorporated by reference.

BACKGROUND OF THE INVENTION

Field of the Invention

The present invention relates to a tail light for use as a back-up light and for the simultaneous lighting of a ground region behind a motor vehicle with at least one light source and with a light guide body, into which light generated by the light source can be coupled in and out of which back-up light can be coupled out, and the light for illuminating the ground region can be coupled out, wherein the light guide body has a light entry area through which light from the light source can be coupled into the light guide body, wherein the light guide body has a first light exit area for the back-up light and a second light exit area for the light for illuminating the ground region, wherein the first and the second light exit areas may overlap and wherein the light guide body has a first reflection surface on which a part of the coupled-in light can be deflected to at least one of the light exit areas.

Description of the Background Art

From FIGS. 4 and 5 of the document with the publication number DE 10 2005 042 574 A1, a tail light with an LED is known as a light source, said back-up light having a light guide body with parallel side walls which are connected on the front side to a first light decoupling area that is arcuate in vertical cross section, and adjacent thereto, to an arcuate second light decoupling area. Within the light guide body, a reflection surface is provided, on which coupled-in light can be deflected.

With such a tail light, it is possible to radiate both back-up light as well as to illuminate the ground behind a vehicle.

Document DE 10 2005 042 574 A1 proposes to arrange two of these tail lights side by side. These then form a lighting device.

This lighting device has the function of a back-up light. It is indeed possible to produce a light bundle with the legally required properties for the back-up light. However, it is not limited to the function of a back-up light. Due to the further function of simultaneously illuminating the ground behind a vehicle while the back-up lamp is radiating light, the ground can be illuminated when the vehicle equipped with the lighting device backs up, which is sufficient to capture said ground clearly by means of a rear view camera so that said ground can be displayed with sufficient quality on a screen near the driver's seat.

SUMMARY OF THE INVENTION

It is therefore an object of the present invention to avoid the need for two tail lights to be provided for sufficient lighting in order to obtain adequate lighting.

An exemplary embodiment of the invention therefore relates to a tail light, which by itself meets the necessary requirements for a back-up light and can be used to illuminate the ground.

This object is achieved in that the first reflection surface is curved and/or corrugated as a whole or at least in one section.

As a result of the at least partially curved and/or corrugated first reflection surface, it can be accomplished that the light is distributed within the light guide body, together with the deflection of the light, a fact which together with the first light exit area and the second light exit area ensures optimum distribution of the light produced by the LED for the back-up light and for the light for lighting the ground. This way, in particular, it can be achieved that a desired light distribution is achieved on the ground and at the same time, a back-up light is produced using a tail light in accordance with legal requirements. Due to the fact that the reflection surface in the light guide body of the tail light known from the conventional art is flat, generation of optimum light distribution for the functions of the tail light within the light guide body is, at best, only possible to a limited extent.

The first reflection surface of the light guide body of a tail light according to the invention can be curved outwards as a whole or at least in a section.

In this case, the first reflection surface may be curved as a whole or at least in one section in a direction transverse to a main emission direction of the back-up light. This means that cuts through the light guide body, which lie perpendicular to the main emission direction of the back-up light, exhibit a curved cross-sectional surface.

The first reflection surface may be curved as a whole or at least in one section in a channel-like or convex manner. It is particularly advantageous if the first reflection surface is corrugated.

The corrugated first reflection surface is particularly advantageous when the light guide body has a plurality of first light exit areas and a plurality of second light exit areas. The light can then be distributed selectively and individually to the first and second light exit areas by the waves of the first reflection surface.

A special feature of a tail light according to the invention may be that the light guide body has a section with a plurality of outwardly projecting or curved and adjacent facets, wherein the facets have at least one first and/or at least one second light exit area. As compared to the light exit areas of the tail light known from document DE 10 2005 042 574 A1, small light exit areas are created by means of the facets, which by their shape distribute the light coupled out over the light exit areas in the desired manner. It is possible that facets have only first or only second light exit areas. It is also possible that facets are shaped such that, in particular, in interaction with the first reflection surface, light is predominantly coupled out of the light guide body over a first or a second light exit area. The interaction between the first reflection surface and the facets can include the fact that the design of the first reflection surface, for example by means of waves of the first reflection surface, diverts light specifically to individual facets or groups of facets, and then couples out light via these facets over the first light exit areas or the second light exit areas.

The section of the light guide body of a tail light according to the invention, in which the facets are provided, may have different subsections. In a second subsection, back-up light can be predominantly or exclusively coupled out via the facets, and in a second subsection, light for illuminating the ground region can be predominantly or exclusively coupled out via the facets. In a back-up light according to the invention, the second subsection can be disposed between two first subsections, subject to the geometric boundary conditions.

Although it is an advantage that a tail light according to the invention can be sufficient on its own for adequately illuminating the ground region behind the vehicle, according to the invention, a vehicle can also be provided with two lights.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a section through the light guide body along the line IV-IV in FIG. 2;

FIG. 5 is a view of the light guide body from behind along the arrow V;

FIG. 6 is a detail of FIG. 3 with light rays illustrated therein;

DETAILED DESCRIPTION

Figure 1:
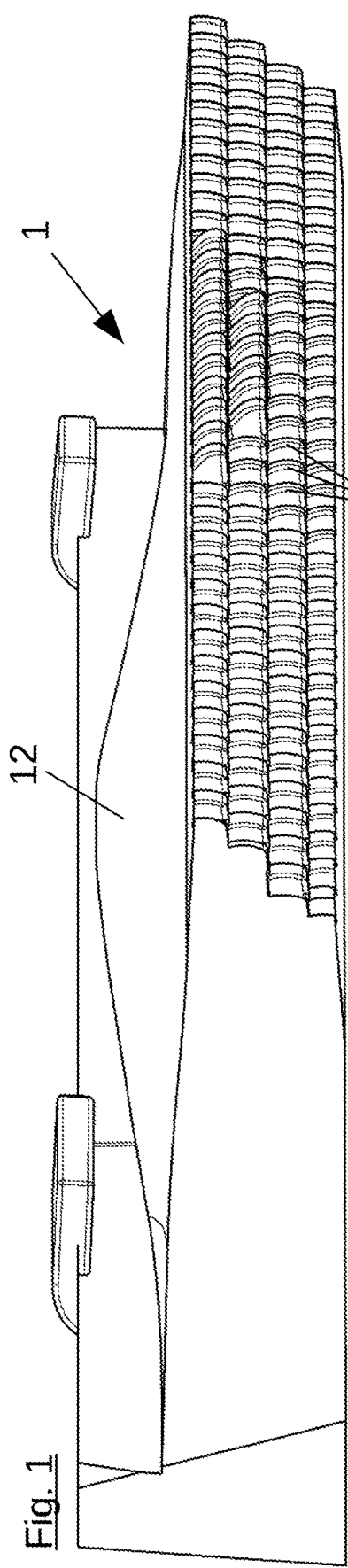
FIG. 1 is a light guide body of a first tail light according to an exemplary embodiment of the invention, viewed obliquely from behind.
Figure 3:
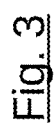
FIG. 3 is a section through the light guide body along the line III-III in FIG. 2.
Figure 2:
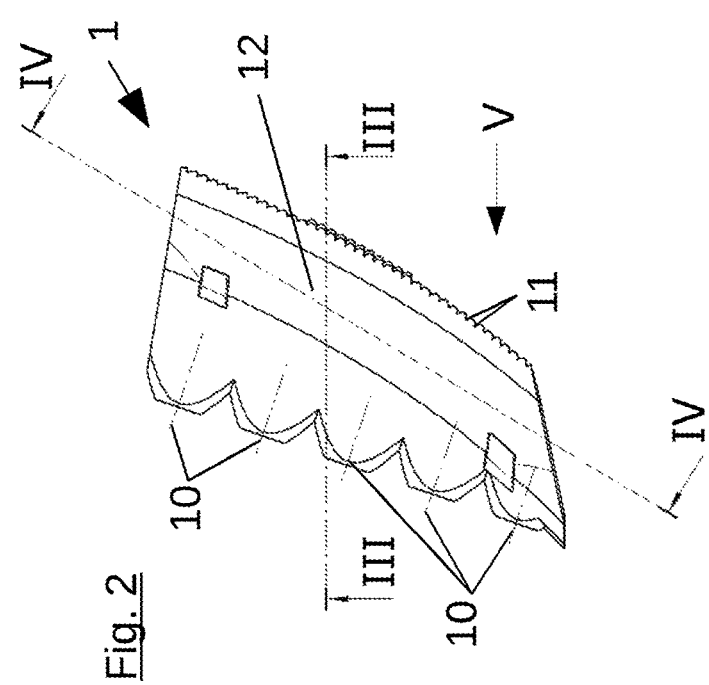
FIG. 2 is a plan view of the light guide body.

The light guide body 1 shown in FIGS. 1 to 6 is provided for installation in a tail light on a left side of the vehicle, in particular at the rear left corner of the vehicle, which is why the light guide body 1 has a contour typical for tail lights in this location, which can be seen in particular in the plan view.

From the front, light generated by five light emitting diodes is coupled into the light guide body 1. For this purpose, the light guide body 1 has five domes 10, into each of which the light of a light emitting diode can be coupled. The domes 10 form light entry areas, which together with the light emitting diodes and, as appropriate, their optics, ensure that the coupled-in light is conducted rearwards in parallel to the back side of the light guide body.

At the back of the light guide body, a plurality of outwardly projecting or curved and adjacent facets 11 are provided. These have first and second light exit areas.

The first light exit areas are provided for the back-up light, and the second light exit areas are provided for the light for illuminating the ground region. There are facets which have only a first light exit area, there are facets which have only a second light exit area and there are facets 11 which have both first and second light exit areas, which can also overlap in the facets.

The light guide body 1 is designed such that it has a first reflection surface 12. At this first reflection surface 12, a part of the coupled-in light is reflected and deflected downwards. The special feature of this first reflection surface 12 is that it is curved outwards. By reflecting a portion of the light that can be coupled into the light guide body at the curved first reflection surface 12, this light is directed to the facets 11 with the first and second light exit areas such that by means of further deflection of the light in the first and second light exit areas, a desired light distribution is created in particular on the ground behind the vehicle, which is equipped with a tail light comprising the illustrated light guide body.

The facets 11 are arranged side by side in horizontal rows. Several rows are arranged one above the other. It is possible that the facets 11 of an upper row project farther outward than the facets 11 in the lower rows. This makes it possible, in particular, to provide a second light exit area on an underside of a facet, via which light is conducted to the ground. But it is also possible that the facets of the different rows project outwards to the same extent.

FIG. 6 shows some examples of rays used for illuminating the ground or for the back-up light. Rays which are responsible for stray light or have undesirable but not completely avoidable side effects are not shown in FIG. 6, but may nevertheless be present.

Two bundles of rays are clearly visible, which are reflected at the first reflection surface and thereby deflected downwards.

The rays of the upper of the two bundles are partially reflected at the facet 11a shown in the second row from the top, so that the rays are deflected even further downwards and exit at the bottom of the facet 11a. Another portion of the rays of this bundle pass through the facet 11a but are deflected downwards.

The rays of the upper bundle pass through the facet 11b located under the facet 11a and are deflected downwards to illuminate the ground.

Due to the curvature of the first reflection surface, better light distribution is possible as compared with a non-curved first reflection surface. The curvature of the first reflection surface 12 can be seen in FIG. 1, but in particular in FIGS. 4 and 5 in lines 124 and 125.

Figure 8:
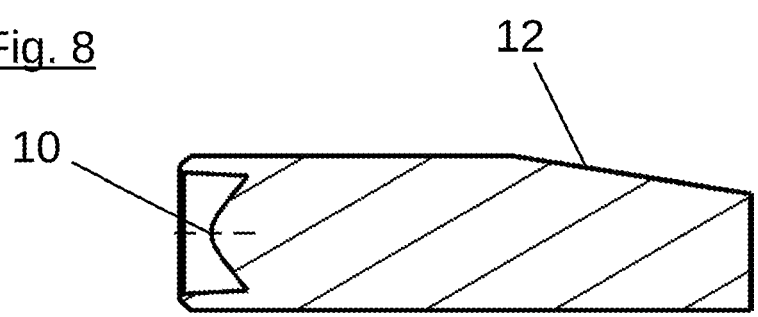
FIG. 8 is a cut through the section of the light guide body along the line VIII-VIII in FIG. 7.
Figure 7:
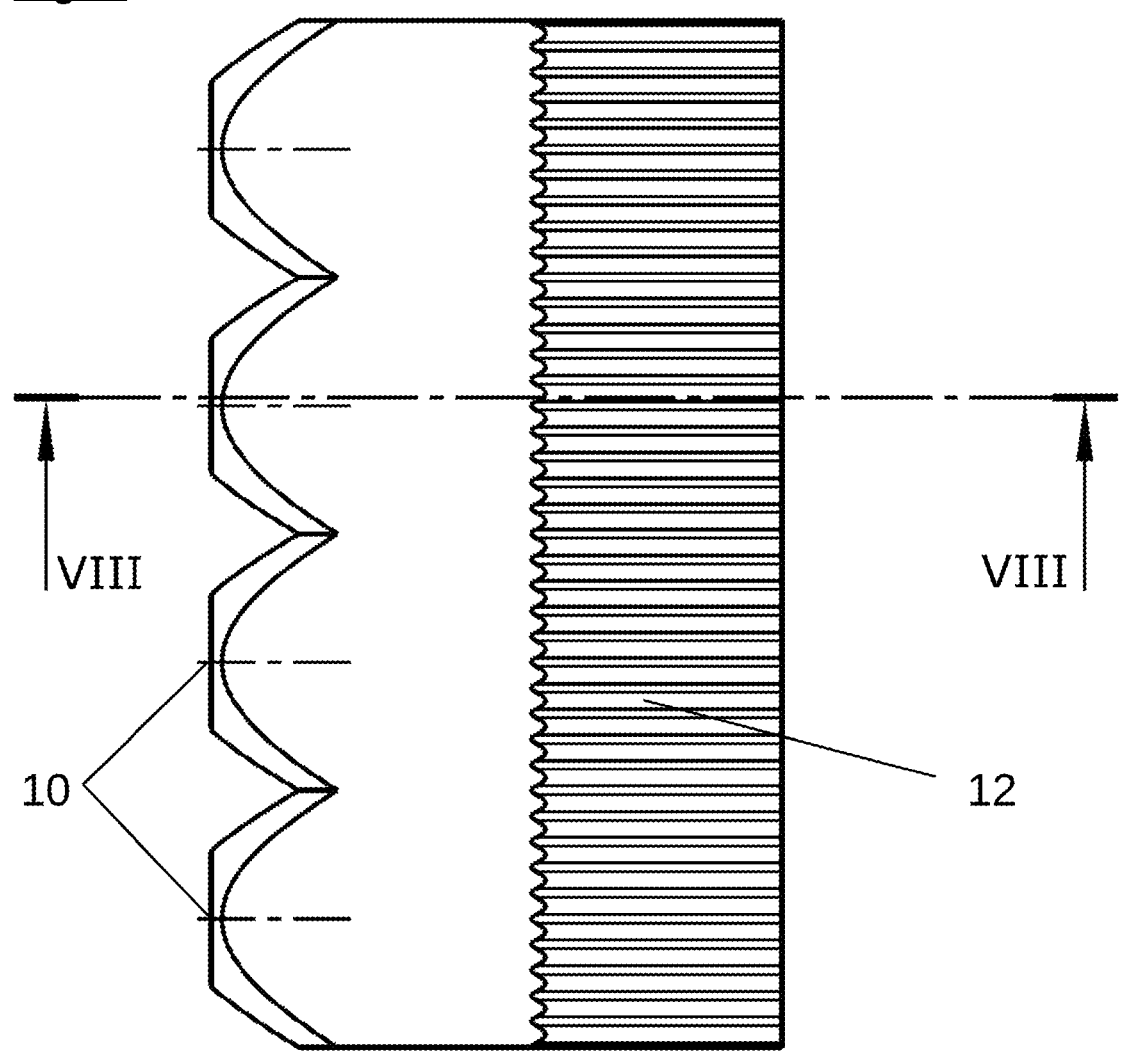
FIG. 7 is a plan view of a section of a light guide body of a second tail light according to an exemplary embodiment of the invention.

An equally good effect for improving the light distribution, in particular on the ground, can be achieved by a corrugated first refection surface 12, as is provided in the light guide body, which is shown in part in FIGS. 7 and 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A tail light for use as a back-up light and for a substantially simultaneous lighting of a ground region behind a motor vehicle, the tail light comprising:
   at least one light source; and
   a light guide body into which light generated by the light source is adapted to be coupled and out of which back-up light is adapted to be coupled out, and light for illuminating the ground region is adapted to be coupled out,
   wherein the light guide body has a light entry area through which light from the light source is adapted to be coupled into the light guide body,
   wherein the light guide body has at least a first light exit area for the back-up light and a second light exit area for the light for illuminating the ground region, wherein the first and the second light exit areas overlap, wherein the light guide body has a first reflection surface, at which a first part of the coupled-in light is deflected in a direction of at least one of the first or second light exit areas, such that the coupled-in light includes the first part that is deflected by the first reflection surface and a second part that is directed to at least one of the first or second light exit areas without being deflected by the first reflection surface, and wherein the first reflection surface is curved as a whole or at least in one section.

2. The tail light according to claim 1, wherein the first reflection surface is curved outwards as a whole or at least in one section.

3. The tail light according to claim 2, wherein the first reflection surface is curved as a whole or at least in one section in a direction transverse to a main emission direction of the back-up light.

4. The tail light according to claim 1, wherein as a whole or at least in one section, the first reflection surface is channel-like, wave-like or convexly curved.

5. The tail light according to claim 1, wherein the first reflection surface is corrugated.

6. The tail light according to claim 1, wherein the light guide body has a plurality of the first light exit area and a plurality of the second light exit area.

7. The tail light according to claim 6, wherein the light guide body has a section of a plurality of adjacent facets, where each facet is an inwardly or outwardly curved projection, and wherein the facets comprise the first and the second light exit areas.

8. The tail light according to claim 7, wherein, in a first subsection of the section of the light guide body having the plurality of facets, the back-up light is predominantly or exclusively coupled out via the facets, and in a second subsection of the section of the light guide body having the plurality of facets, the light for illuminating the ground region is predominantly or exclusively coupled out via the facets.

9. The tail light according to claim 8, wherein the second subsection is disposed between two of the first subsection, the second subsection is disposed above the first subsection or the second subsection is disposed below the first subsection.

10. The tail light according to claim 7, wherein the light for illuminating the ground region that is coupled out of the second light exit area is directed downward due to a curvature of the facets.

11. The tail light according to claim 7, wherein the plurality of facets are arranged in rows one above the other in a stepped configuration, such that an uppermost row projects farther outward than all other rows located below the uppermost row.

12. The tail light according to claim 11, wherein the uppermost row of facets is located closer to the first reflection surface than a lowermost row.

* * * * *